(No Model.)

E. V. OVERMAN.
VEHICLE RUNNING GEAR.

No. 420,606.  Patented Feb. 4, 1890.

Witnesses
Frank L. Millward
F. Davis

Inventor
Eugene V. Overman
By his Attorney
Geo. F. Murray

UNITED STATES PATENT OFFICE.

EUGENE V. OVERMAN, OF CINCINNATI, OHIO.

VEHICLE RUNNING-GEAR.

SPECIFICATION forming part of Letters Patent No. 420,606, dated February 4, 1890.

Application filed November 13, 1889. Serial No. 330,137. (No model.)

*To all whom it may concern:*

Be it known that I, EUGENE V. OVERMAN, a citizen of the United States, and a resident of Cincinnati, in the county of Hamilton and State of Ohio, have invented certain new and useful Improvements in Vehicle Running-Gear, of which the following is a specification.

The object of my invention is to provide a cheap running-gear for spring-wagons and dispense with the head-block or bolster and reach. These objects I attain by the means illustrated in the accompanying drawings, in connection with which the invention will be first fully described, and will then be particularly referred to and pointed out in the claims.

Figure 1:
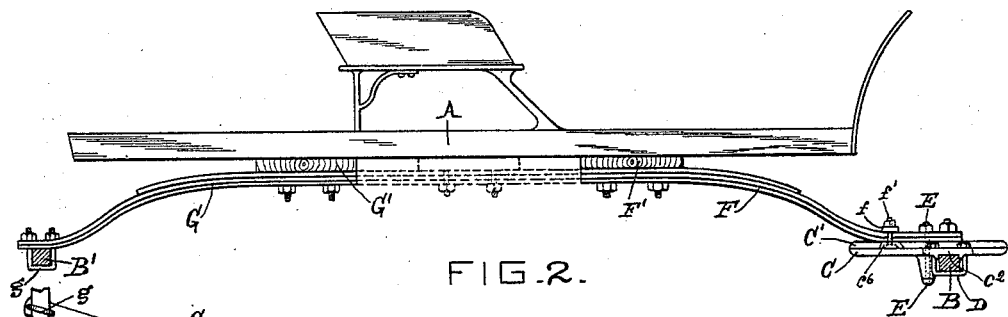
Figure 2:
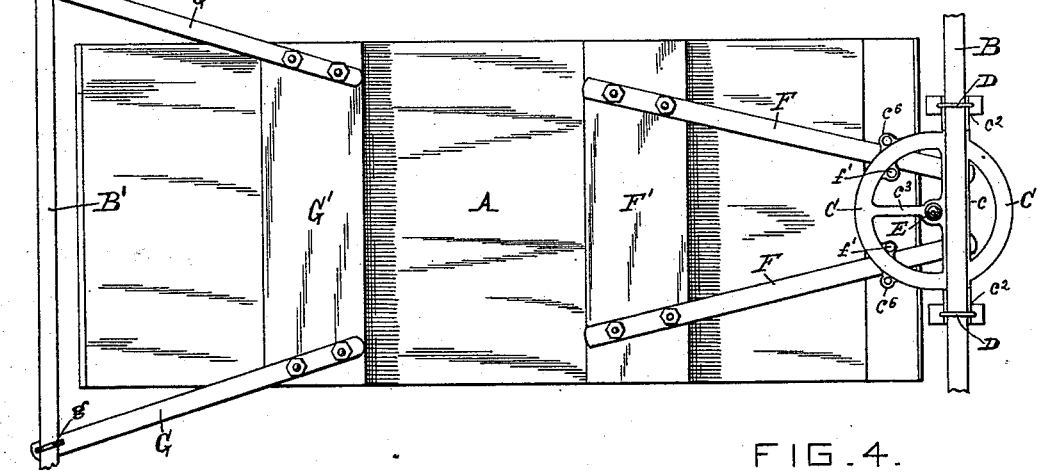
Figures 3, 4:
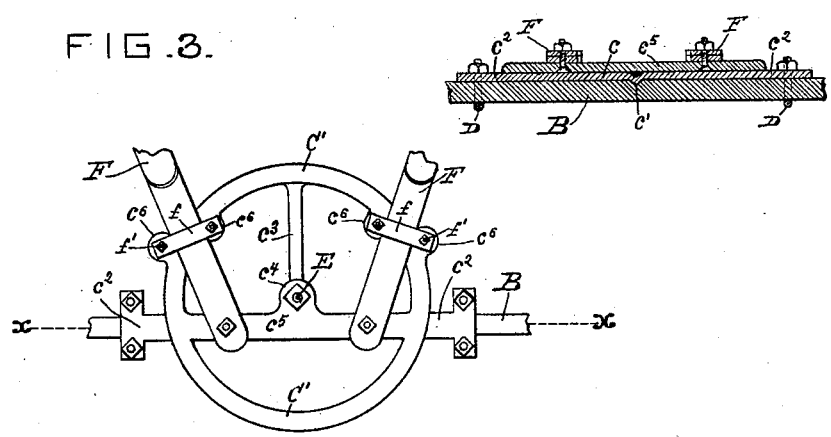

Referring to the drawings, in which like parts are indicated by similar reference-letters wherever they occur throughout the various views, Figure 1 is a side elevation of a vehicle embodying my invention. Fig. 2 is an inverted plan view of the same. Fig. 3 is a detail plan view of the fifth-wheel and its connections upon an enlarged scale. Fig. 4 is a sectional view through line $x\ x$.

The body A illustrated in the drawings is what is known as the "buckboard pattern;" but my invention is also applicable to other forms.

The axles B B' are the ordinary straight iron axles.

The fifth-wheel, which is of the ring pattern, is secured rigidly upon the front axle. The central bar $c$ of the lower plate C rests upon the axle, and has a downwardly-projecting nipple $c'$, which enters a depression in the top of the axle to prevent the fifth-wheel from moving longitudinally upon the axle. The plate is rigidly held upon the axle by clips D, the screw-threaded eyes of which pass through lugs which project laterally from the extensions $c^2$ of the lower plate C. These lugs have downwardly-projecting flanges which pass upon each side of the axle to assist in holding the plate C in place. The upper plate C' of the fifth-wheel is centrally connected to the lower one by the pivot-bolt E, which passes through a boss and the bar $c^3$, from the under side of which bar the boss projects, and the lug $c^4$, which projects from the central bar $c^5$ of the upper plate C'. The bar $c^3$ connects the bar $c$ and the ring of the lower plate C.

The body is supported upon two sets of springs F and G, the heavy ends of which are secured to spring-bars F' G', respectively. The light ends of the springs are secured, respectively, to the rear axle and the fifth-wheel. The ends of the springs F are bolted upon the bar $c^5$ of the top plate, and are firmly clipped down upon its ring by clip-bars $f$ and bolts $f'$, which pass through the clip-bars and lugs $c^6$, which project from the outer and inner edges of the upper plate C'.

The springs F diverge from the fifth-wheel to their points of attachment to the spring-bar F', near the opposite sides of the body, while the springs G diverge from their point of attachment to the spring-bar G' to near the shoulders of the rear axle B', and are secured upon the rear axle by clips $g$, which pass around the bottom and sides of the axle through holes in the lower plate of the springs G, and have nuts upon their upper ends.

If round instead of square or angular-shaped axles are employed, the lower portion of the fifth-wheel should be made concave to fit it snugly, and while I have shown and prefer the full-circle fifth-wheel a semicircular one may also be employed, and these may project either from the rear or from the front side of the axle; and it is also obvious that the fifth-wheel may be secured underneath as well as to the top of the front axle. The springs F in this case would of course be curved to be connected underneath the fifth-wheel instead of upon top of it, as shown. It is also obvious that instead of employing two sets of springs two single long springs may be used, which would extend from the fifth-wheel to the rear axle; but I prefer the form shown as the more economical method of mounting the body, and the gear is better braced and less liable to get out of shape.

I claim—

1. The combination, substantially as specified, in a wagon-gear, of the axles B B', the fifth-wheel having its lower plate C secured upon the front axle, the springs F, having their light ends secured to the cross-bar $c^5$ and the circle of the upper plate C', the springs G, having their light ends secured to the rear axle, and the body A, supported upon said springs, the springs F diverging from near the sides of the body to near the shoulders of the axles.

2. The combination of the front axle having a depression near its center, the lower plate C of the fifth-wheel having cross-bar $c$, and a projection from said bar to enter the depression in the axle, projecting lug-plates from the periphery of said plate, and clips to secure the lower plate C to the axle, the bar $c^3$, and bolt E to pivot the upper plate C' to the lower plate, the upper plate C', and the springs F, secured to the upper plate to support the front of the body, substantially as shown and described.

EUGENE V. OVERMAN.

Witnesses:
F. DAVIS,
GEO. J. MURRAY.